Figure 1:
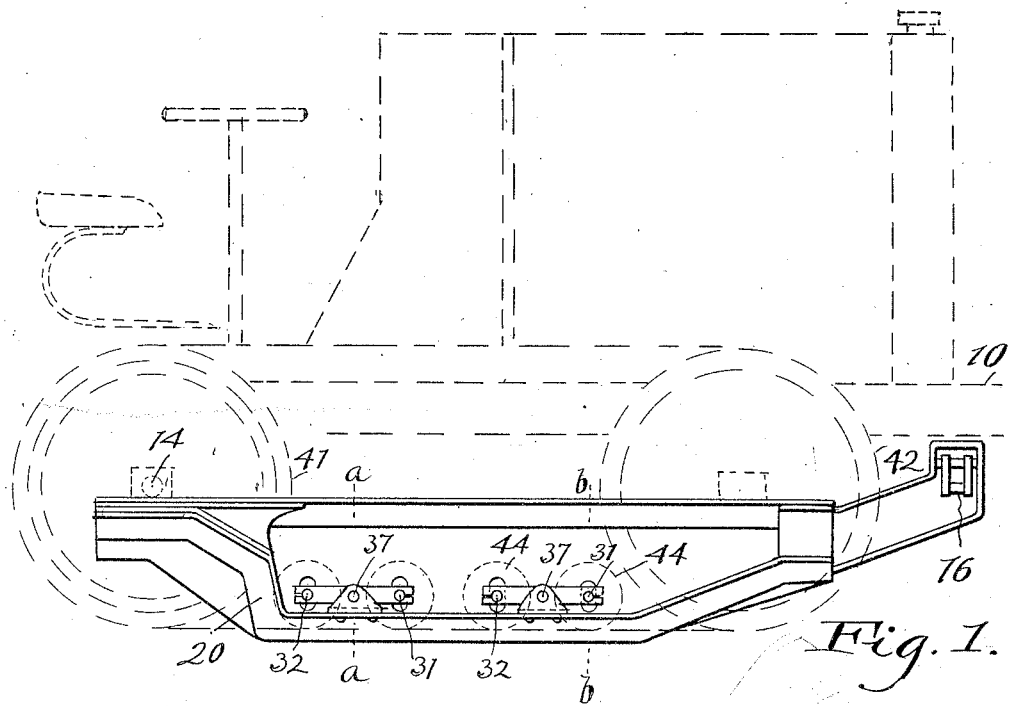

R. H. WHITE.
TRACK LAYING TRACTOR.
APPLICATION FILED MAY 1, 1919.

1,326,702.

Patented Dec. 30, 1919.

Inventor
Rollin H. White
By
Thurston Bates & Hudson
attys.

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

TRACK-LAYING TRACTOR.

1,326,702.  Specification of Letters Patent.  Patented Dec. 30, 1919.

Application filed May 1, 1919. Serial No. 293,968.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Track-Laying Tractors, of which the following is a full, clear, and exact description.

In nearly all of the varieties of track laying tractors which have had any substantial degree of practical success, the main frame has suitable load supporting connections with two track frames located on opposite sides thereof; and these track frames have been provided with wheels or rollers which make rolling contact with the ground reaches of the track belt, which thereby ultimately supports the load. When the tractor is operating on rough ground, the ground reaches of the track, as they are laid down, obviously assume wavy up and down position. The wheels, as they roll upon the track, are therefore continously going up and down small inclines presented by the track.

The object of this invention is to minimize the transmission to the trucks of these up and down movements of the wheels; and to do this by inexpensive means.

The invention consists in the construction and combination of parts shown in the drawings and hereinafter described and pointed out definitely in the appended claim.

Figure 2:
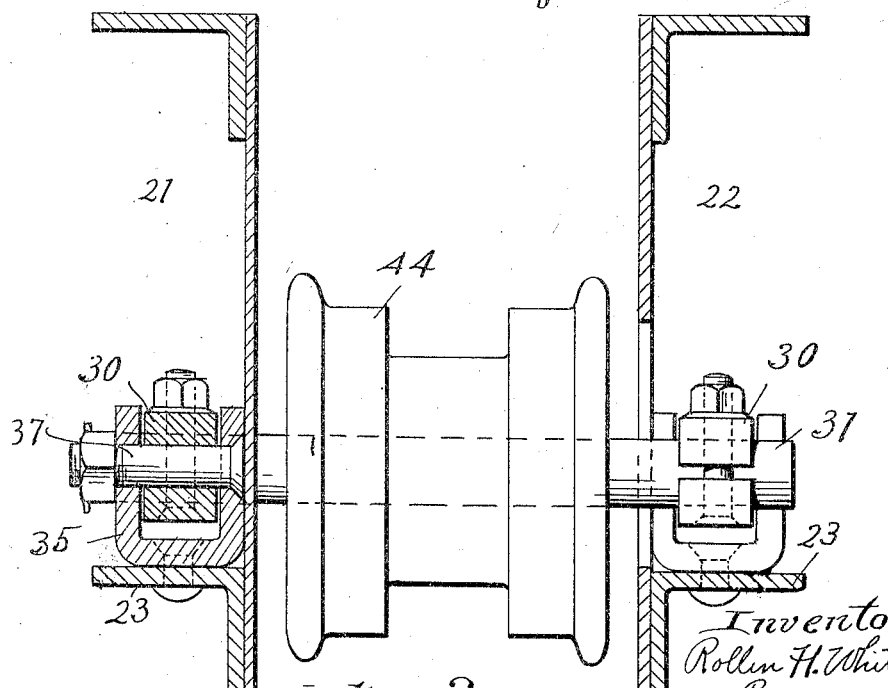

In the drawings, Figure 1 is a side elevation of a tractor in which the present invention is embodied; Fig. 2 is a transverse sectional view one side being in the plane of line *a—a* on Fig. 1, and the other side being in the plane of line *b—b*.

The invention is exemplified in connection with such a track laying tractor substantially as is shown and described in my prior Patent No. 1,253,319.

As shown in the drawings, 10 represents the main frame of the machine. On each side thereof is a track frame 20 which is pivotally hung on a lateral extension of the rear axle 14, on which also the driving sprocket 41 is rotatably mounted. A spring 16 connects the front ends of the track frame with the main frame. An idler wheel 42 is mounted on each track frame near its front end. Each endless track belt goes around a rear sprocket and a front idler. Each track frame carries one or more pairs of track wheels 44 adapted to make rolling contact with the ground reaches of the track belt.

The present invention relates to the means for mounting these wheels or rollers upon the track frame.

Each track frame includes two parallel spaced apart side beams 21, 22. Each beam includes an angle bar 23 having an outwardly extended horizontal web or flange. By outwardly is meant extending in a direction away from the space between the two beams.

The track wheels 44 are located between the two beams, and they are associated in pairs. One wheel of each pair is rotatably mounted in a transversely extended shaft 31 which is rigidly fixed to the front end of two rocking levers 30, while the other wheel 44 is rotatably mounted on a transversely extended shaft 32 fixed to the rear end of said two levers.

Each of these levers is pivotally supported by a U-shaped bracket 35 which is fixed to the outwardly extending horizontal flange of one of the side members of the track frame, that is to say, one U-shaped bracket is fixed to the horizontal flange associated with the outside frame member, and the other is fixed to the horizontal flange associated with the inside frame member. Each of the two levers 30 goes between the upwardly extended ears of the associated bracket, and both levers are pivoted to the bracket, by a pin 37 which extends transversely through the ears of both brackets and through the associated levers. At the front and rear ends of both levers there is a split sleeve in which is fitted and clamped the shaft on which one of the track wheels is mounted.

Having described my invention, I claim:—

In a track laying tractor having a main frame and track frames connected to opposite sides thereof, the combination with the two spaced apart side members of a track frame, with two levers pivoted to opposite sides of the track frame on alined axes, a shaft which extends between and is connected with the front ends of the two levers, a second shaft which is connected with the rear ends of the two levers, and track engaging rollers which are respectively mounted rotatably on said two shafts and are located between the two side members of the track frame.

In testimony whereof I hereunto affix my signature.

ROLLIN H. WHITE.